United States Patent [19]

Hogan

[11] 3,956,257

[45] May 11, 1976

[54] HYDROCARBYLALUMINUM HYDROCARBYLOXIDE ANTIFOULING AGENT IN OLEFIN POLYMERIZATION PROCESS

[75] Inventor: John P. Hogan, Bartlesville, Okla.

[73] Assignee: Phillips Petroleum Company, Bartlesville, Okla.

[22] Filed: Aug. 14, 1975

[21] Appl. No.: 604,757

[52] U.S. Cl. .................................. 526/64; 260/93.7; 526/74; 526/81; 526/105; 526/350; 526/352
[51] Int. Cl.² ....................... C08F 2/14; C08F 4/52; C08F 10/00; C08F 10/02
[58] Field of Search ..................... 260/93.7, 94.9 D

[56] References Cited
UNITED STATES PATENTS

| | | | |
|---|---|---|---|
| 2,984,657 | 5/1961 | Grundmann et al. | 260/94.9 |
| 3,146,223 | 8/1964 | Cheney | 260/93.7 |
| 3,164,620 | 1/1965 | van der Minne et al. | 260/438 |
| 3,248,179 | 4/1966 | Norwood | 23/285 |
| 3,294,773 | 12/1966 | Gans et al. | 260/94.9 |
| 3,324,095 | 6/1967 | Carrick et al. | 260/88.2 |
| 3,330,818 | 7/1967 | Derby | 260/94.9 |
| 3,405,109 | 10/1968 | Rohlfing | 260/88.2 |
| 3,451,785 | 6/1969 | Rohlfing | 23/285 |
| 3,642,749 | 2/1972 | Johnson et al. | 260/88.2 R |
| 3,674,450 | 7/1972 | Filachek et al. | 44/66 |
| 3,758,283 | 9/1973 | Matt | 44/62 |
| 3,878,179 | 4/1975 | Hogan | 260/94.9 D |
| 3,891,611 | 6/1975 | Abe et al. | 260/94.9 D |

*Primary Examiner*—Alan Holler

[57] ABSTRACT

In a process for producing olefin polymers, a hydrocarbylaluminum hydrocarbyloxide such as diethylaluminum ethoxide is introduced into the reaction zone in a stream separate from the catalyst to reduce fouling.

10 Claims, No Drawings

HYDROCARBYLALUMINUM HYDROCARBYLOXIDE ANTIFOULING AGENT IN OLEFIN POLYMERIZATION PROCESS

BACKGROUND OF THE INVENTION

This relates to aliphatic 1-olefin polymerization under conditions designed to give polymer insoluble in the reaction medium.

It has long been known to produce aliphatic 1-olefin polymers utilizing supported chromium-containing catalysts. Later developments in this area have included the production of such polymers under conditions of relatively low temperature so that the polymer produced is largely insoluble in the reaction medium. In such processes the diluent, catalyst and monomer are mixed in a reaction zone and the polymer withdrawn. One particularly suitable technique for carrying out this operation is to utilize a loop reactor with the resulting polymer being withdrawn either continuously or intermittently.

In these various processes there is sometimes encountered severe problems with fouling due to polymer particles building up on the wall of the reaction zone and thus interfering with heat transfer and ultimately causing complete stoppage of the polymerization.

Aluminum alkoxides are known as catalyst adjuvants and have been utilized to effect changes in polymerization characteristics by contacting same with the catalyst prior to introduction of the catalyst into the reactor as disclosed, for instance, in Johnson et al. U.S. Pat. No. 3,642,749.

SUMMARY OF THE INVENTION

It is an object of this invention to avoid reactor fouling in aliphatic mono-1-olefin polymerizations;
  it is a further object of this invention to utilize a hydrocarbylaluminum hydrocarbyloxide in a polymerization process without obtaining catalyst modification normally associated with its use;
  it is yet a further object of this invention to provide improved heat transfer in a 1-olefin polymerization; and
  it is still yet a further object of this invention to provide an improved process for producing polymer in slurry utilizing a loop reactor.

In accordance with this invention, a hydrocarbylaluminum hydrocarbyloxide is introduced as a separate stream into a reaction medium for producing 1-olefin polymers utilizing a supported chromium-containing catalyst.

DESCRIPTION OF THE PREFERRED EMBODIMENTS

The hydrocarbylaluminum hydrocarbyloxide for use in this invention can be any compound having the formula $R_nAl(OR)_{3-n}$ wherein n is an integer of 1 or 2 and R is a hydrocarbyl radical having 1 to 14 carbon atoms selected from alkyl, cycloalkyl, and aromatic groups, preferably an alkyl radical having 1 to 6 carbon atoms. Exemplary compounds are diethylaluminum ethoxide, diisobutylaluminum isobutoxide, and ethylaluminum diethoxide.

The hydrocarbylaluminum hydrocarbyloxide can be used in an amount within the range of 0.5 to 50, preferably 1 to 20, parts by weight per million parts by weight of diluent.

The hydrocarbylaluminum hydrocarbyloxide can be made by reacting a hydrocarbylaluminum such as triethylaluminum with an alcohol such as ethyl alcohol. Generally, about a stoichiometric amount of each component will be used. A slight excess of the hydrocarbylaluminum can be used if desired and/or 1–25 weight percent of hydrocarbylaluminum can be added to the reactor along with the hydrocarbylaluminum hydrocarbyloxide.

It is essential that the hydrocarbylaluminum hydrocarbyloxide be added in a stream separate from the catalyst so as to avoid contact of the catalyst with the hydrocarbylaluminum hydrocarbyloxide prior to the time the catalyst contacts the reaction medium. This can be done by adding the hydrocarbylaluminum hydrocarbyloxide along with the diluent and/or along with the monomer when the monomer is a liquid. Also, the hydrocarbylaluminum hydrocarbyloxide can be added as a stream separate from either the catalyst, monomer, or diluent.

The instant invention is applicable to the polymerization of monomer comprising at least one mono-1-olefin having 2 to 8 carbon atoms per molecule. The invention is of particular utility in the homopolymerization or copolymerization of ethylene, particularly the homopolymerization of ethylene.

The polymerization process of this invention is carried out at a temperature at which substantially all of the polymer formed is insoluble in the diluent. Such processes are described in Rohlfing U.S. Pat. No. 3,405,109, the disclosure of which is hereby incorporated by reference. Preferably, the reaction is carried out in a loop reactor having means therein for causing the reaction mixture comprising the polymer, monomer, catalyst and diluent to circulate with the product being withdrawn either periodically or continuously. Any reaction mode including a batch reactor where the monomer, catalyst and diluent can be mixed can be used, however. Preferably, the temperature will be in the range of 150° F. (66° C.) to 230° F. (110° C.).

The catalyst for use in the process of the invention can be any supported chromium-containing catalyst as disclosed, for instance, in Hogan et al U.S. Pat. No. 2,825,721, the disclosure of which is hereby incorporated by reference. Preferably, the catalyst is chromium oxide supported on silica.

EXAMPLE I

In the following runs, the importance of the order of addition of hydrocarbylaluminum hydrocarbyloxides in the copolymerization of ethylene and 1-butene is shown. In Run 1 the catalyst was contacted with diisobutylaluminum isobutoxide (DIBAI) prior to addition of the monomer as is known in the art whereas in Run 2 the diisobutylaluminum isobutoxide was added as a separate stream after introduction of the diluent, catalyst and monomer. The reaction was carried out in a 2-liter stirred reactor containing 1.1 lbs. (498.9 g) isobutane as diluent at 222° F. (106° C.) and 550 psig (3.8 M Pa gage) with a catalyst consisting of 2 weight percent chromium oxide supported on microspheroidal silica activated at 800° F. (427° C.). The diluent was isobutane with 430 ml hydrogen amounting to 50 psig (344.7 k Pa gage partial pressure) being added to the reactor. There was 4.6 and 4.1 weight percent of 1-butene comonomer added along with the ethylene. A small amount of triisobutylaluminum (20 weight percent of the DIBAI) was also present in the catalyst system. The results were as follows:

| Run | Hydro-carbyloxide Contacted Catalyst Before Monomer | Productivity in Pounds Polymer per Pound of Catalyst | Polymer Properties | | |
|---|---|---|---|---|---|
| | | | Density g/cc | MI* g/10 min. | HLMI/MI Ratio** |
| 1 | Yes | 1920 | 0.952 | 0.63 | 117 |
| 2 | No | 2190 | 0.949 | 0.09 | 138 |

*According to ASTM D 1238-62T, Condition E.
**HLMI is according to ASTM D 1238-62T, Condition F. The ratio gives an indication of molecular weight distribution, the higher the ratio the broader the distribution.

This data shows that different polymer is obtained (lower MI, higher HLMI/MI ratio) when the catalyst is allowed to contact the hydrocarbylaluminum hydrocarbyloxide prior to contact with the monomer (Run 1), as compared with adding the hydrocarbylaluminum hydrocarbyloxide after introduction of the catalyst (Run 2).

EXAMPLE II

The following data were obtained in operation of a 23-gallon (0.087 m$^3$) loop reactor for the production of ethylene homopolymer. Ethylene, catalyst and isobutane were continuously fed to the circulating loop, and polymer product, ethylene, catalyst, and isobutane were continuously withdrawn. Ethylene feed rate was 15 pounds (6.8 kg)/hour and isobutane rate was 7.5 gph (0.0079 dm$^3$/s). Diethylaluminum ethoxide, when used, was continuously fed along with the ethylene and isobutane stream in a nozzle flush line, and thus was kept separate from the catalyst prior to contact with the reaction medium. The catalyst was chromium oxide in an amount sufficient to give 1 weight percent chromium on finely divided silica and was identical for each run. The results were as follows:

| Run | 1 | 2 |
|---|---|---|
| Catalyst activation temperature, °F. (°C.) | 1300 (704) | 1300 (704) |
| Ethylene concentration, wt. % | 5.1 | 4.7 |
| Diethylaluminum ethoxide, parts per million based on weight of isobutane | 0 | 5 |
| Reactor temperature, °F. (°C.) | 224 (107) | 223 (106) |
| Catalyst Productivity, lb./lb. | 5300 | 5300 |
| Polymer melt index | 0.14 | 0.13 |
| Polymer density/grams/cc | 0.960 | 0.953 |
| Reactor/coolant, ΔT maximum, °F. (°C.) | 16 (8.9) | 12 (6.7) |
| Reactor remained operable | No | Yes |

These data show that the ΔT, which indicates how clean the inside reactor wall remains, was lower when diethylaluminum ethoxide was present. In its absence, ΔT increased and wall fouling started. The fouling generally starts at about a ΔT of 14° F.

In the reactor, a constant coolant circulation is maintained through the reactor jacket so that the difference in temperature between the reactor contents and coolant (ΔT) is representative of the polymerization reaction. When heat transfer is decreased due to a coating of polymer on the reactor walls (wall fouling), ΔT increases.

As can be seen the melt index was not changed significantly by this method of adding the hydrocarbylaluminum hydrocarbyloxide. Apparently, in the presence of the alkoxide, a portion of the ethylene was converted into 1-butene, etc., which copolymerized with the ethylene to form a lower density polymer as the difference in densities between Run 1 (0.960 g/cc density) and Run 2 (0.953 g/cc density) indicates.

While this invention has been described in detail for the purpose of illustration, it is not to be construed as limited thereby but is intended to cover all changes and modifications within the spirit and scope thereof.

I claim:

1. A process for producing polymer wherein at least one mono-1-olefin having 2 to 8 carbon atoms per molecule is introduced into a reaction zone along with a supported chromium-containing catalyst and diluent and the resulting reaction mixture is mixed therein, this mixing being carried out at a temperature such that polymer thus produced is insoluble in said diluent, the improvement comprising: adding a hydrocarbylaluminum hydrocarbyloxide having the formula $R_nAl(OR)_{3-n}$ wherein n is an integer of 1 to 2 and R is an alkyl, cycloalkyl or aromatic radical having from 1 to 14 carbon atoms, to said zone via a stream separate from that used to introduce said catalyst so as to avoid contact between said catalyst and said hydrocarbylaluminum hydrocarbyloxide prior to contact with said reaction medium, said hydrocarbylaluminum hydrocarbyloxide being added in an amount effective to reduce reactor fouling.

2. A method according to claim 1 wherein said olefin is ethylene.

3. A method according to claim 1 wherein said temperature is within the range of 150° to 230° F.

4. A method according to claim 1 wherein said hydrocarbylaluminum hydrocarbyloxide is diethylaluminum ethoxide.

5. A method according to claim 1 wherein said catalyst is chromium oxide supported on silica.

6. A method according to claim 1 wherein said process is carried out in a loop reactor.

7. A method according to claim 1 wherein said hydrocarbylaluminum hydrocarbyloxide is added in an amount within the range of 0.5 to 50 parts by weight per million parts by weight of said diluent.

8. A method according to claim 1 wherein said hydrocarbylaluminum hydrocarbyloxide is added along with said diluent.

9. A method according to claim 1 wherein said hydrocarbylaluminum hydrocarbyloxide is added in an amount within the range of 1 to 20 parts by weight per million parts by weight of said diluent, said catalyst is chromium oxide supported on silica, said hydrocarbylaluminum hydrocarbyloxide is diethylaluminum ethoxide, said temperature is 150° to 230° F. and said diluent is isobutane and said reaction is carried out in a loop reactor.

10. A method according to claim 1 wherein said hydrocarbylaluminum hydrocarbyloxide is diisobutylaluminum isobutoxide.

* * * * *